UNITED STATES PATENT OFFICE.

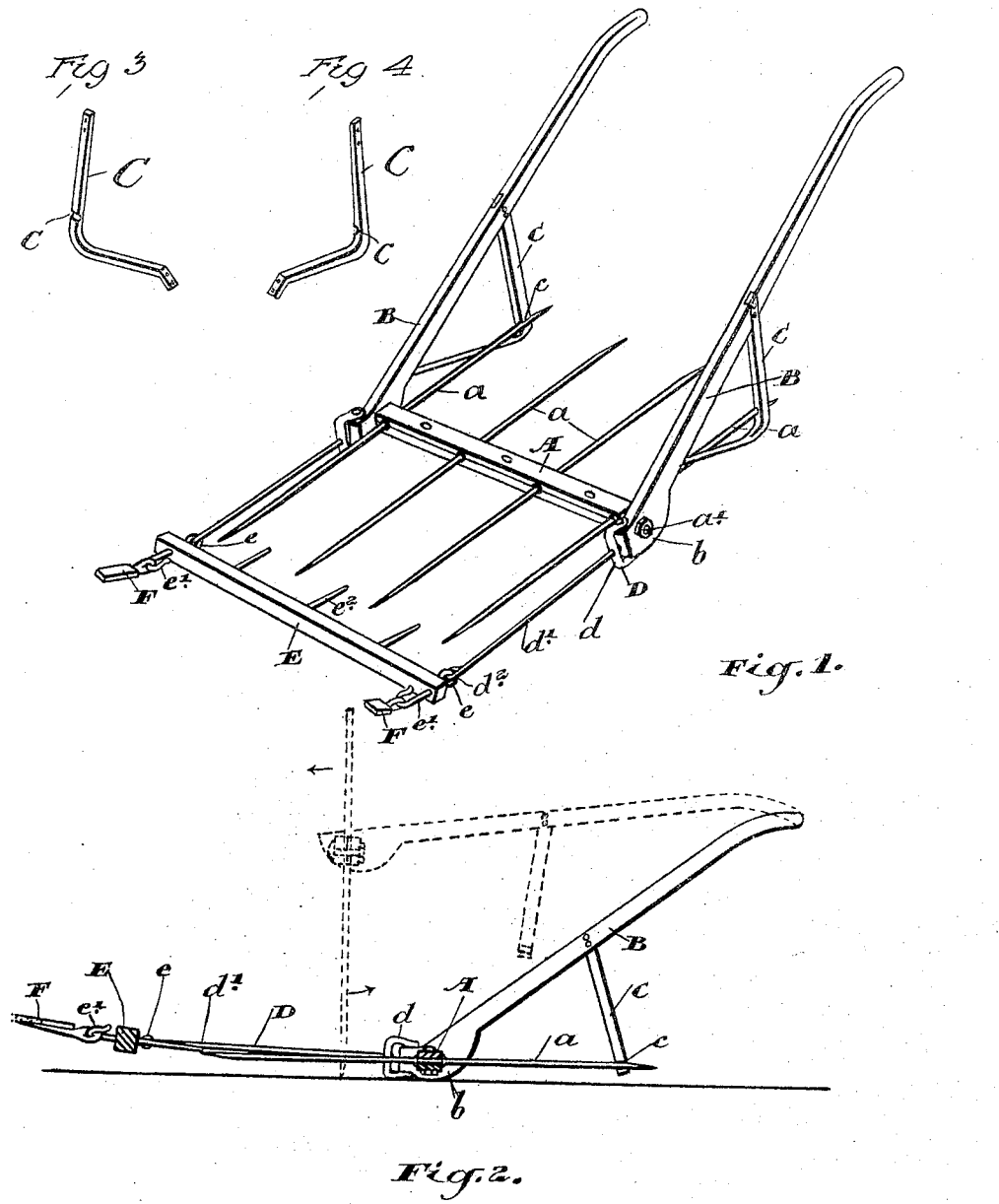

ANDREW STEWART MILNE, OF LEASKDALE, CANADA.

MANURE HORSE-FORK.

No. 798,067.  Specification of Letters Patent.  Patented Aug. 29, 1905.

Application filed June 24, 1904. Serial No. 214,035.

*To all whom it may concern:*

Be it known that I, ANDREW STEWART MILNE, farmer, of the village of Leaskdale, in the county of Ontario, in the Province of Ontario, Canada, have invented certain new and useful Improvements in Manure Horse-Forks, of which the following is the specification.

My invention relates to improvements in manure horse-forks; and the object of the invention is to devise a fork for handling manure which may be drawn by a horse, which will effect a saving of time in loading manure; and it consists, essentially, of a double-pronged fork the prongs of which are connected centrally by an axle which is journaled in suitable handles, such handles being detachably connected to the prongs located to the rear when not in use, and a retaining-frame extending forwardly from the handles to which they are connected by a clevis, the traces being suitably connected to the ends of such frame and the parts being otherwise constructed and arranged in detail as hereinafter more particularly explained.

Figure 1 is a perspective view of my improved fork. Fig. 2 is a longitudinal section showing by dotted lines the position of the fork when being dumped of the manure. Figs. 3 and 4 are perspective views of one of the braces.

In the drawings like letters of reference indicate corresponding parts in each figure.

$a\ a\ a\ a$ are the prongs of the fork, which extend through and are suitably secured within the axle A, which may be made of wood or any other suitable material in two pieces, as shown, or in any other suitable manner. The prongs $a$ are preferably secured at the center of their length. The axle A is provided with end trunnions $a'$, which extend through the enlarged runner-shaped end $b$ of the handles B.

C represents braces secured to the handles intermediate of their length and having the side notches $c$, into which the side prongs of the then rear end of the fork extend, being held therein by the inward pressure of the handles.

D is a forwardly-extending frame, consisting of the clevis $d$, pivotally connected to the front of the runner-shaped portion of the handle, the side rods $d'$ having a play at the rear end in the clevis and eyes $d^2$ at the front end.

E is a cross-bar having eyes $e$, through which the eyes $d^2$ extend.

F represents traces, which are connected to the hooks $e'$, forming part of the eyes $e$.

$e^2$ represents prongs extending rearwardly from the bar E.

Having now described the principal parts involved in my invention, I shall briefly describe its operation and utility. The driver of the horse may, by grasping the handles B and guiding the horse, drive it into a manure heap and get a load for the major portion in front of the axle A. The front frame, consisting of the portions E and D and their parts, will serve to retain the load in position—that is to say, prevent it from sliding off the front end of the fork. The horse consequently may be driven to a suitable place of deposit, such as a loading-platform, and the handles may be elevated sufficiently so as to depress the front end of the fork, when the handles may be pushed forward and the fork thrown into the position shown in dotted lines in Fig. 2, and thereby the contents of the fork dumped.

It will of course be understood that the front frame E D would when in use be raised to such a height by the horse to which it is connected by the traces that it would not interfere with the depositing of the load to the rear of the bar E—that is to say, would pass between the axle and the bar E.

In order to effect the dumping expeditiously, the handles B are pressed outwardly by the driver, so as to readily disengage the outer prongs of the then rear portion of the fork from the notches $c$ in the braces C.

After the manure has been dumped the horse may be driven forwardly over the dumped manure, when the fork will rotate on its axle, and the prongs which are formerly to the rear will pass in the direction indicated by arrow to the front, and the front prongs of the fork will likewise pass rearwardly past the bottoms of the braces C into the notches $c$, in which position the fork will now be held securely until it has been driven forwardly on the runners $b$ to the manure heap to take a fresh load again.

It will be seen that by such a manure horse-fork as I describe I am enabled without delay to quickly remove the manure to any suitable place of deposit with but a minimum amount of manual labor, and thereby effect a great saving of time.

It will be seen that the braces C are substantially right-angular braces and form shoes for supporting the handles when the locking-notches are not engaged by the prongs. In practical use, of course, the handles have to spring inwardly, so as to bring the notches to straddle the prongs and hold them rigidly in position.

In constructing my forwardly-extending frame D E, I preferably make the clevis $d$ with a hole of such a size as will permit of the forward ends of the bars $d'$ to rise sufficiently to dump without any tendency of the handles being thrown over.

What I claim as my invention is—

In a manure horse-fork, the combination with the handles and axle and double-prong fork extending through the axle, of the forwardly-extending frame consisting of the rear clevis pivotally connected to the front of the handles, the rods extending through the clevis and provided at the front end with eyes, the cross-bar provided with rearwardly-extending prongs and the eyes connected to the aforesaid eyes at the end of the rod and hooks for the attachment of the traces as and for the purpose specified.

ANDREW STEWART MILNE.

Witnesses:
M. McLAREN,
A. NEWLANDS.